Dec. 29, 1964  J. W. FITZSIMMONS  3,163,189
CONTAINER
Filed July 31, 1961

INVENTOR.
JAMES WILLIAM FITZSIMMONS
BY Leland R. McCann
George W. Reiber
ATTORNEYS

3,163,189
CONTAINER
James William Fitzsimmons, East Rockaway, N.Y., assignor to American Can Company, New York, N.Y., a corporation of New Jersey
Filed July 31, 1961, Ser. No. 128,182
2 Claims. (Cl. 141—381)

The present invention relates generally to containers having a dispensing mouth for liquid products or for granular products such as coffee and the like and has particular reference to such a container which includes a combination measuring cup gasket element and a readily removable sealing cap for the mouth of the container.

An object of the invention is to provide a container for granular products such as coffee and the like which may or may not generate a pressure within the container, the container providing for hermetic sealing, venting of its head space to relieve generated pressure, and opening of the container in a single operation with one hand.

Another object is to provide in the container a built-in measuring cup element which may be used to measure specific quantities of the container product as it is dispensed.

Another object is to provide such a container in which the parts are simply and economically constructed and which may be easily assembled into a finished product.

Another object is to provide such a container which after opening may be readily reclosed so as to produce a practically air-tight seal to preserve the remaining contents in the container.

Another object is to provide such a container in which raw edges are entirely eliminated so as to protect the consumer against injury.

Numerous other objects and advantages of the invention will be apparent as it is better understood from the following description, which, taken in connection with the accompanying drawings, discloses a preferred embodiment thereof.

Referring to the drawings.

As a preferred and exemplary embodiment of the invention, the drawings disclose a container for granular products such as coffee and the like, which comprises a tubular body 12, a bottom closure 13, a measuring cup gasket element 14 and a sealing cap 15.

Figure 3:
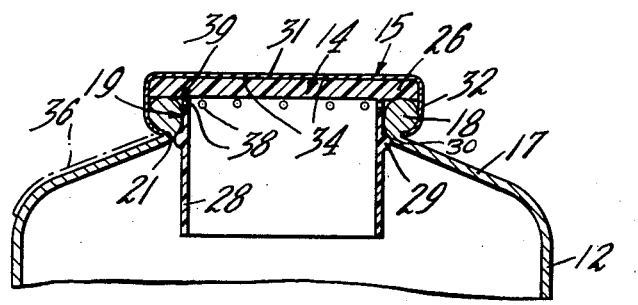
FIG. 3 is an enlarged sectional view of the upper portion of the container as taken substantially along the line 3—3 in FIG. 2.

The container body 12 preferably is cylindrical in shape and preferably made of aluminum by the impact extrusion process so as to provide a seamless body having a full open bottom end and an integral domed shape top end or breast 17. The top end 17 terminates in an annular bead or round flange 18 (FIG. 3) which surrounds and defines an open mouth or dispensing opening 19 for the container. If desired the bead 18 may be solid as shown in FIG. 3 or may be an open curl type bead. In either case, a clinching channel or groove 21 is provided under the bead 18 for the sealing cap 15 as will be hereinafter explained.

The bottom open end of the body 12 is permanently closed preferably with an imperforate sheet metal end closure 23, secured to the lower marginal edge portion of the body in a suitable end seam 13 such as the well known container double seam or a variation thereof.

At its upper end, the container after filling with a product, is provided with the measuring cup gasket element 14 (FIG. 3) which preferably is made of a relatively resilient or pliable plastic material such as polyethylene. This measuring cup gasket element 14 comprises a flat circular gasket or sealing member 26 which rests on top of the container body bead 18 as shown in FIG. 3 and forms a seal against the bead. The gasket member 26 is formed with a depending cylindrical skirt wall section or stopper portion 28 which extends downwardly into and through the mouth 19 of the container. The skirt wall section 28 and the included portion of the gasket member 26 define and constitute a measuring cup which may be used to measure out a predetermined amount of the product when the latter is dispensed from the container.

The measuring cup gasket element 14 besides being used as a seal for the mouth of the container and a measuring cup, is also utilized as a reclosure for the container after the latter is opened. For this purpose the outside diameter of the skirt wall section 28 is slightly smaller than the inside diameter of the bead 18 so as to provide an easy frictional fit within the mouth of the container. In order to retain the measuring cup gasket element 14 in place when used as a reclosure, an outwardly projecting annular ridge or a plurality of annularly spaced nodes or projections 29 are formed on the skirt wall section 28 at a location to engage under and lock against an internal shoulder 30 adjacent the container mouth 19.

The sealing cap 15 preferably is made of an easily tearable material, such as aluminum and comprises an imperforate top wall 31 and a surrounding and depending annular skirt wall 32. When the sealing cap 15 is in sealing position on the container, the cap top wall 31 lies flat against the top of the gasket member 26 as shown in FIG. 3 and the skirt wall 32 extends down adjacent the outer edge of the gasket member 26 and the bead 18 and is tightly crimped under the bead 18 and into the crimping channel 21 hereinbefore mentioned. The sealing cap 15 thus holds the measuring cup gasket element 14 tightly in place and slightly compresses the plastic gasket member 26 against the bead 18 to provide a hermetic seal for the product within the container.

Figure 1:
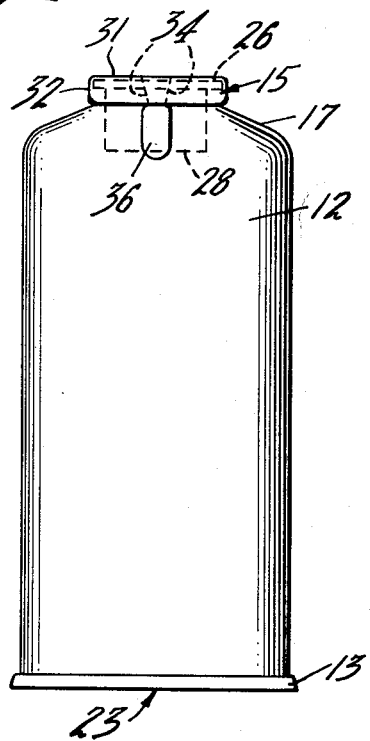
FIGURE 1 is an elevational view of a container embodying the instant invention.
Figure 2:
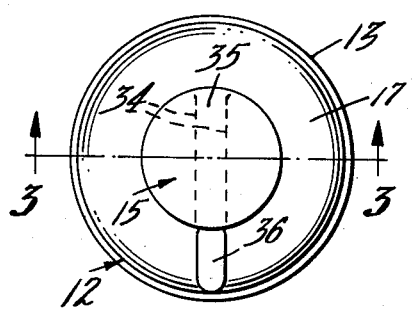
FIG. 2 is a top plan view of the container.

To facilitate opening of the container by removing the entire cap 15 in a single hand operation, the top wall of the cap is provided with a pair of spaced score lines 34 (FIG. 2) which extend into and along the skirt wall 32 of the cap on one side of the cap only as shown in FIG. 1. These score lines 34 set off a removable tearing strip 35 which terminates in a pull tab or tongue 36 which projects below the skirt wall 32 and lies against the domed breast 17 of the container as shown in dot and dash lines in FIG. 3. The skirt wall 32 on the side of the cap, opposite the pull tab 36, is free of score lines.

Hence by an upward pull on the tab 36, the tearing strip 35 is partially torn free from the top of the cap 15 and the entire cap loosened to such an extent that continued pulling on the tab, causes the torn through portions of the cap to spread laterally and thereby permit the ruptured cap as a unit to be lifted off the container while still grasping the pull tab.

It is well known that coffee generates a gas and when confined in a container the generated gas builds up a pressure within the container. The instant invention provides for venting this generated gas if such be desired. For this purpose, the skirt wall section 28 of the measuring cup gasket element 14 may be perforated to provide a plurality of apertures or vent holes 38 annularly spaced around the skirt wall section 28 and located closely adjacent the gasket member 26 for communication with the space 39 adjacent the rounded top edge of bead 18.

Hence when the generated gas builds up a pressure within the container, the gas escapes through the vent holes 38 and temporarily may lift the gasket member 26 off its seat on the bead 18 sufficiently to escape past the seal and escape through the crimped edge of the sealing cap 15. When the internal pressure is sufficiently relieved the hermetic seal is reestablished. In this manner the generated gas gradually escapes and the internal pressure is maintained under control. Obviously the gas may be prevented from escaping, or the degree of gas escape may be controlled by varying the tightness of union between skirt 32 of the cap and container bead 18.

The vent holes 38 are also used to permit rapid escape of the gas from the container when the sealing cap 15 is removed to open the container. This rapid escape of the gas prevents the measuring cup gasket element 14 from being forcibly blown out of place when the container is initially opened.

It is thought that the invention and many of its attendant advantages will be understod from the foregoing description, and it will be apparent that various changes may be made in the form, construction and arrangement of the parts without departing from the spirit and scope of the invention or sacrificing all of its material advantages, the former hereinbefore described being merely a preferred embodiment thereof.

I claim:

1. A flexible and resilient closure member for a container having a dispensing mouth, a bead surrounding the mouth, and an internal shoulder adjacent the mouth, said closure member comprising:
   a sealing gasket portion adapted to extend over the container mouth and to be disposed in sealing engagement with the container bead,
   a skirt portion depending from said gasket portion and adapted to be disposed within the container mouth in engagement with the adjacent portions of the container,
   said skirt portion and said gasket portion defining a measuring receptacle for a product within the container, and
   a projection extending outwardly from said skirt portion and adapted to engage the internal container shoulder when said gasket portion is disposed in sealing engagement with the container bead to thereby retain said gasket portion in engagement with the bead,
   said skirt portion having a plurality of vent holes formed therein and disposed closely adjacent said gasket portion, said vent holes being adapted to vent the interior of the container to the atmosphere when said closure member is positioned on the container and said gasket portion is lifted from the container bead.

2. A container, comprising:
   a container body having a dispensing mouth, an annular bead surrounding the mouth, and an internal shoulder adjacent the mouth;
   a flexible and resilient closure member comprising:
   a sealing gasket portion extending over said container body mouth and disposed in sealing engagement with said container body bead,
   a skirt portion depending from said gasket portion and disposed within said container body mouth in engagement with the adjacent portions of the container body,
   said skirt portion and said gasket portion defining a measuring receptacle for a product within said container body, and
   a projection extending outwardly from said skirt portion and in engagement with said internal container body shoulder to retain said gasket portion in engagement with said bead,
   said skirt portion having a plurality of vent holes formed therein and disposed closely adjacent said gasket portion, said vent holes being adapted to vent the interior of said container body to the atmosphere when said gasket portion is lifted from said container body bead, and
   a cap member disposed over said closure member and said container body bead, said cap member being provided with tear means to facilitate removal thereof from said container body.

References Cited in the file of this patent

UNITED STATES PATENTS

| | | |
|---|---|---|
| 545,679 | Cills | Sept. 3, 1895 |
| 982,760 | Bernau | Jan. 24, 1911 |
| 1,947,915 | Marschall | Feb. 20, 1934 |
| 2,526,225 | Gronemeyer et al. | Oct. 17, 1950 |
| 2,559,168 | Numbers | July 3, 1951 |
| 2,975,947 | Pellett | Mar. 21, 1961 |
| 2,991,913 | Goth | July 11, 1961 |

FOREIGN PATENTS

| | | |
|---|---|---|
| 5,209 | Great Britain | Dec. 19, 1878 |
| 268,348 | Switzerland | Aug. 16, 1950 |